United States Patent
Audsin et al.

(10) Patent No.: US 10,476,856 B2
(45) Date of Patent: Nov. 12, 2019

(54) METHOD FOR AUTHENTICATING A DEVICE

(71) Applicant: ORANGE, Paris (FR)

(72) Inventors: Dev Pramil Audsin, London (GB); Zaheer Ahmad, London (GB); Jean-Philippe Wary, Bourg la Reine (FR); Mobeen Qureshi, Surrey Guilford (GB)

(73) Assignee: Orange, Paris (FR)

( * ) Notice: Subject to any disclaimer, the term of this patent is extended or adjusted under 35 U.S.C. 154(b) by 62 days.

(21) Appl. No.: 14/960,165

(22) Filed: Dec. 4, 2015

(65) Prior Publication Data
US 2016/0182481 A1    Jun. 23, 2016

(30) Foreign Application Priority Data
Dec. 19, 2014 (EP) .................................. 14307099

(51) Int. Cl.
| | |
|---|---|
| H04L 29/06 | (2006.01) |
| G06F 21/44 | (2013.01) |
| G06F 21/31 | (2013.01) |
| H04L 29/08 | (2006.01) |
| H04L 9/32 | (2006.01) |

(Continued)

(52) U.S. Cl.
CPC .............. *H04L 63/08* (2013.01); *G06F 21/31* (2013.01); *G06F 21/44* (2013.01); *G09C 1/00* (2013.01); *H04L 9/002* (2013.01); *H04L 9/3271* (2013.01); *H04L 63/0876* (2013.01); *H04L 63/102* (2013.01); *H04L 67/306* (2013.01)

(58) Field of Classification Search
CPC .......... G06F 21/00; G06F 21/30; G06F 21/31; H04L 63/08; H04L 63/102; H04L 9/3271
See application file for complete search history.

(56) References Cited

U.S. PATENT DOCUMENTS

| | | | | |
|---|---|---|---|---|
| 8,285,648 | B2 * | 10/2012 | Goodin ................... | G06Q 20/02 705/44 |
| 2008/0005037 | A1 * | 1/2008 | Hammad ............. | G06Q 20/085 705/67 |

(Continued)

FOREIGN PATENT DOCUMENTS

| | | |
|---|---|---|
| EP | 2 431 904 | 3/2012 |
| WO | 2014/202718 | 12/2014 |

OTHER PUBLICATIONS

European Search Report for EP 14 30 7099 application.

*Primary Examiner* — Eric W Shepperd
(74) *Attorney, Agent, or Firm* — Haverstock & Owens LLP

(57) ABSTRACT

Present system relates to a method for authenticating a first device, the method being executed by a second device, the second device comprising a database, the database storing a profile associated to a user of the first device, the second device using the profile of the user to generate a first challenge comprising a question and a corresponding response for authentication of the first device, the method comprising, upon successful authentication of the first device using the first challenge, the steps of collecting contextual information from the first device and updating the profile associated to the user of the first device with the received contextual information for a subsequent generation of a second challenge for authentication of the first device.

18 Claims, 2 Drawing Sheets

(51) Int. Cl.
*G09C 1/00* (2006.01)
*H04L 9/00* (2006.01)

(56) References Cited

U.S. PATENT DOCUMENTS

| | | | | |
|---|---|---|---|---|
| 2009/0037983 | A1* | 2/2009 | Chiruvolu | G06F 21/31 726/4 |
| 2010/0114776 | A1* | 5/2010 | Weller | G06F 21/31 705/44 |
| 2010/0302255 | A1* | 12/2010 | Brown | G06T 1/0021 345/473 |
| 2012/0072975 | A1* | 3/2012 | Labrador | G06F 21/31 726/6 |
| 2012/0317622 | A1* | 12/2012 | Harjanto | G06F 21/44 726/4 |
| 2013/0054614 | A1* | 2/2013 | Boyd | G06Q 10/10 707/748 |
| 2013/0160098 | A1* | 6/2013 | Carlson | G06F 21/45 726/6 |
| 2013/0212653 | A1* | 8/2013 | Hoghaug | G06F 21/34 726/5 |
| 2013/0269013 | A1* | 10/2013 | Parry | H04L 63/0861 726/7 |
| 2013/0282400 | A1* | 10/2013 | Al-Moosawi | G06F 19/321 705/3 |
| 2014/0137203 | A1* | 5/2014 | Castro | H04L 67/02 726/4 |
| 2014/0259130 | A1 | 9/2014 | Li et al. | |
| 2014/0279532 | A1* | 9/2014 | Tremlet | G06F 21/73 705/44 |
| 2014/0330760 | A1* | 11/2014 | Meier | G06F 17/3089 706/12 |
| 2015/0017967 | A1* | 1/2015 | Cao | H04W 4/18 455/418 |
| 2015/0106216 | A1* | 4/2015 | Kenderov | G06Q 20/4014 705/21 |
| 2015/0113599 | A1* | 4/2015 | Curtis | H04L 63/0428 726/4 |
| 2015/0318998 | A1* | 11/2015 | Erlikhman | H04L 9/32 713/171 |
| 2015/0379247 | A1* | 12/2015 | Makofsky | G06F 21/36 726/7 |
| 2016/0134634 | A1* | 5/2016 | Rosendal | H04L 63/08 726/4 |
| 2016/0135139 | A1* | 5/2016 | Jahangir | H04L 65/1016 455/435.1 |
| 2017/0013241 | A1* | 1/2017 | Qian | G06F 3/14 |

* cited by examiner

METHOD FOR AUTHENTICATING A DEVICE

FIELD OF THE PRESENT SYSTEM

The present invention relates generally to systems, methods and processes for computer and network security. More particularly, the present invention relates to an authentication method.

BACKGROUND OF THE PRESENT SYSTEM

Illegitimate accesses to online services or systems are the origin of frauds representing a huge amount of money each year. To mitigate such risks, online services rely on user authentication methods. Most often, a user of an online service is requested to create a user identification (ID) and a password for authentication purpose. Security and confidence in the authentication may be improved by enforcing security rules such as length or complexity of the password.

More robust methods have been developed such as multi-factor authentication. Multi-factor authentication is an approach to authentication which requires the presentation with the user identification of two or more of the three authentication factors:
- a knowledge factor ("something only the user knows", in other word a password),
- a possession factor ("something only the user has", in other word a device or token), and
- an inherence factor ("something only the user is", in other words, biometrics parameters).

After presentation, each factor must be validated by the online service for authentication to occur.

Nevertheless, such methods, if they greatly improve the level of security, quite often present the weakness of being cumbersome for the users. Indeed, the users may not be ready to carry with them a secure token or go through a long authentication process every time they access a service.

Thus, online services may adapt the level of security according to some contextual information in order to facilitate the authentication process in given conditions. Some authentication method implemented for example to control access to a social network or a web site may adapt according to contextual information. Contextual information is information related to the device used by the user to request access to the service like for example the MAC address or the IP address of the device, or any information such as parameters stored on the device. Indeed, using said contextual information, the authentication method may be as simple as asking a login and corresponding password associated to the user. Sometimes, for example, in a web context, using a cookie stored on the device as contextual information may provide an access to a service without the cumbersome step of providing a login or password.

On the other hand, when contextual information does not match or correspond to the expected contextual information, the authentication method may be reinforced, for example by asking some answer to a secret question or by asking the user to answer some questions based on user information comprised in a user profile. Thus, for example, some social network, when a user tries to connect from a device not previously used by this same user to access the social network, may request the user to go through supplementary steps of authentication. This is possible by using contextual information like an ID of the device (media access control (MAC) address, internet protocol (IP) address, international mobile equipment identity (IMEI) . . . ) to identify previously used devices. Fraudulent access to the social network is therefore more complex as an attacker using an unknown device will need to defeat more complex challenges than the normal challenge presented to the user using a known device.

Nevertheless, forging such ID of a device is a known technique. An attacker, forging an ID of a known device of the legitimate user may be presented a simple challenge, or even may gain direct access to the service.

There is a need to improve the security of such authentication method.

SUMMARY OF THE PRESENT SYSTEM

It is an object of the present system to overcome disadvantages and/or make improvements in the prior art.

Present system discloses a method for authenticating a first device, the method being executed by a second device, the second device comprising a database, the database storing a profile associated to a user of the first device, the second device using the profile of the user to generate a first challenge comprising a question and a corresponding response for authentication of the first device, the method comprising, upon successful authentication of the first device using the first challenge, the steps of collecting contextual information from the first device and updating the profile associated to the user of the first device with the received contextual information for a subsequent generation of a second challenge for authentication of the first device.

Therefore, every time the user connects to a service hosted on the server, the user profile is enriched with new or up-to-date contextual information from the first device. This means that by enriching the user profile with contextual information at every connection, it's possible to build challenges that are more complex every next time, or at least new. This is quite advantageous over known methods where the same information is used again and again to build challenges, with the risk that a same challenge may be used several times; which is a weakness in term of security as the method is vulnerable to replay attacks. Present method allows the generation of new challenges every time.

In one embodiment of present system, the method comprises a preliminary step of generating a challenge upon reception of a request for authentication.

Advantageously, the challenge is generated on demand, every time a request for authentication is received. This is quite advantageous as it allows contextual information to be used in various ways. For example, a challenge may be built using contextual information such as user agenda information. If the user agenda indicates that the user is supposed to be in a certain place when the request for information is received, the challenge may comprise a question on the first device location. Indeed, said location should correspond to the previous certain place indicated in the user agenda.

In one embodiment of present system, the generating of the challenge comprises a question and a corresponding response being based at least on most recently received contextual information of the profile.

By using most recently received contextual information from the user profile, the generated challenge is guaranteed to be new. Thus, an attacker that may have gain access to an old version of the profile will not be able to solve any challenge based on an updated profile comprising new contextual information.

In a further complementary embodiment of present system, the receiving a further message from the first device comprises a preliminary step of requesting contextual information from the first device.

Advantageously, the server may request contextual information from the first device, authorizing some control over the frequency of the update of the user profile. Indeed, it may not be necessary to update contextual information every time a user connects to the server, especially if the user last connection is quite recent.

Another object of the invention is a server with means for executing the steps of the method for authenticating a first device. The server comprises a database, the database storing a profile associated to a user of a first device, the server is adapted for using the profile of the user to generate a first challenge comprising a question and a corresponding response for authentication of the first device, upon authentication of the first device, collecting contextual information from the first device and updating the profile associated to the user of the first device with the received contextual information for a subsequent generation of a second challenge for authentication of the first device.

Another object of the invention concerns a computer program or application software, in particular computer programs on or in a non-transitory computer readable medium, suitable for authenticating a first device as disclosed in present document. These programs can use any programming language, and be in the form of source code, binary code, or of code intermediate between source code and object code such as in a partially compiled form, or in any other desirable form for implementing the methods according to the invention.

The information medium may be any entity or device capable of storing the software. For example, the medium can comprise a storage means, such as a ROM, for example a CD/DVD ROM or a microelectronic circuit ROM, or else a magnetic recording means, for example a diskette (floppy disk) or a hard disk.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques and methods are omitted so as not to obscure the description of the present system. It should be expressly understood that the drawings are included for illustrative purposes and do not represent the scope of the present system. In the accompanying drawings, similar reference numbers in different drawings may designate similar elements.

Figure 1:
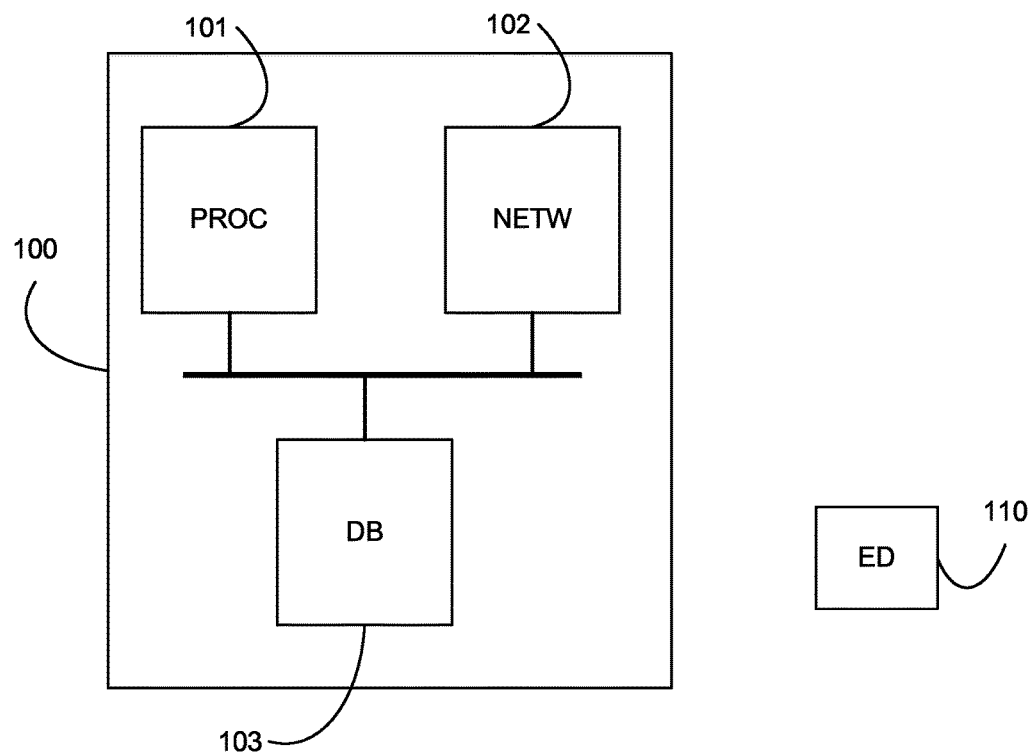
FIG. 1 shows an exemplary system comprising a server and a first device according to one embodiment of present system.

FIG. 1 is an exemplary system comprising a server 100 and a first electronic device 110 (in short, device) according to one embodiment of present system.

In this embodiment, the server 100 is typically hosting one or several social network services. The server 100 comprises for example at least a processor 101, a network module 102 and a database module 103. The database module 103 may store data or may be connected through the network module 102 to others database hosted on servers not represented here. For simplicity sake, it shall be understood that the server 100 comprises a database, the database being either stored locally—the database module 103—, or connected remotely through the network module 102.

The first device 110 can be connected to the server 100, possibly through an internet connection 120. Such device 110 can be for example a computer, a tablet or a smartphone.

A user of the electronic device 110 may access one social network hosted by the server 100 via a web interface using a web browser on the electronic device 110. Alternatively, a dedicated application may be installed on the electronic device to connect to the social network. Such application may be for example downloaded from an application market such as Play™ or Itunes™ or pre-installed on the electronic device 110.

The processor 101 of the server 100 may execute a computer program implementing the method of present system. The method of present system may be executed by the processor 101 or may be executed also partially by other modules of the server 100 not represented in FIG. 1.

Figure 2:
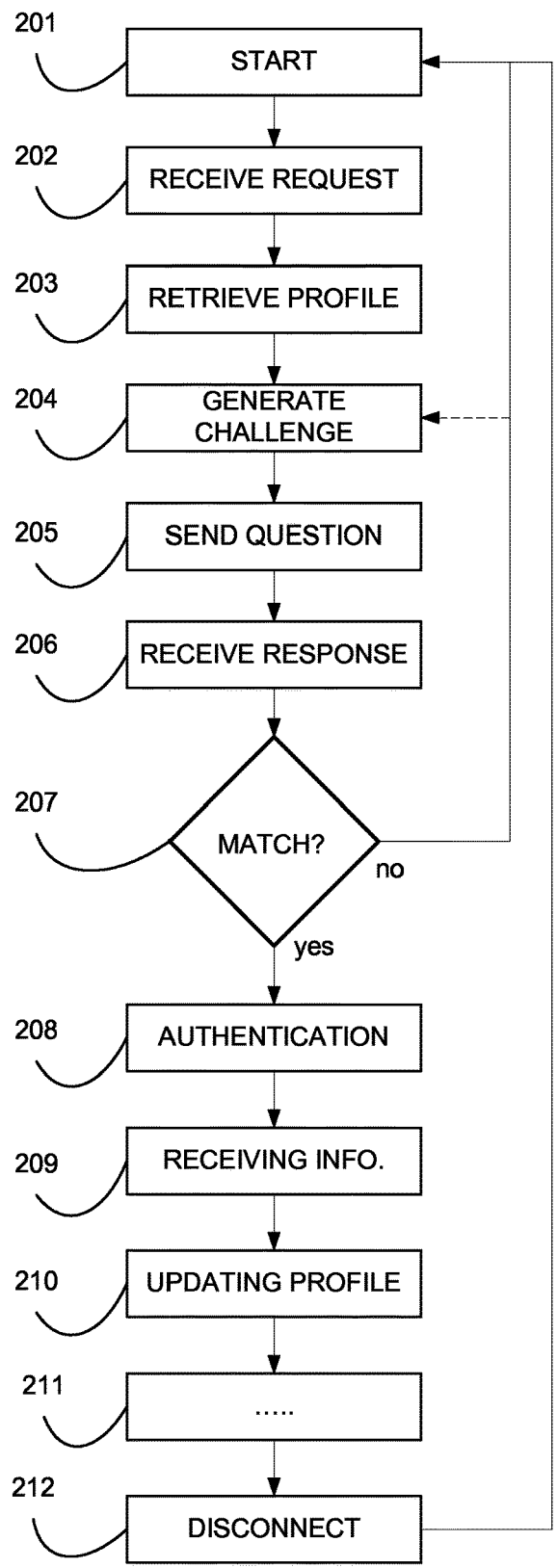
FIG. 2 shows an exemplary flowchart of the method for authenticating a first device according to one embodiment of present system.

The flowchart of FIG. 2 illustrates the method executed by a second device for authenticating a first device according to one exemplary embodiment. FIG. 2 illustrates the different steps followed by a server—the second device—implementing the method of present system. The server can be the server 100 previously described in FIG. 1 while the first device can be the device 110. A computer program may need to be installed on the device 100, or the method may be implemented for example using web technologies.

This illustrative embodiment may correspond for example to the process of authentication for a user trying to access, from a first device 110, to a social network hosted on a server 100—the second device. The server 100 may comprise a database 103 associated to the social network. The database associated to the social network stores profiles associated to the different users of the social network. A profile comprises information about the user, like personal information (first name, last name, date of birth, gender . . . ), information about user connection (social graph: friends, family . . . ), contents, the contents being either directly uploaded by the user or being uploaded by other users connected to the user. The profile may also comprise any contextual information (in short, information) uploaded by the application running on a device—or by a web application executed in a web browser—and stored in association with a user. By contextual information, it shall be understood information related to the first device 110. Thus, the profile may comprise information related to the user, but also information about the device used by the user to connect to the social network, the information about the device being collected by the application used to connect to the social network or the web application of the social network.

The method for authenticating a first device, the method being executed by a second device, the second device comprising a database, the database storing a profile associated to a user of the first device, the second device using the profile of the user to generate a first challenge comprising a question and a corresponding response for authentication of the first device, the method comprising a further authentication of the first device using the first challenge is described in the steps 201 to 208.

In a first step 201, the server 100 is ready to receive any request for authentication from any device. In this state, the user of the first device is not connected to the social network hosted on the server 100. In order to connect to the social network, the user may need to install a dedicated application on the first device 110. Such application may be downloaded on an application market such as Google Play™, Apple iTunes™ or Windows Store™ or possibly directly downloaded form a website of the social network. Alternatively, the application may be pre-installed by the vendor or the network operator of the first device. In another implementation, the application may be integrated in the operating system of the first device 110. Alternatively, the user may connect to the social network using web technology, that is to say using a web browser installed and executed on the first device 110.

Thus, the user may connect to the social network, using one of the alternatives previously disclosed. The user may first be requested by the application or via a web page to enter a login, corresponding to an identifier of the user. Once the login is entered, a message requesting authentication shall be sent to the server 100, the message or request comprising said user login.

In the step 202, the server 100 receives the request for authentication from the first device 110. This request for authentication comprises the login of the user requesting authentication. In an alternative embodiment of present system, the request does not comprise the login, so the server 100 may need to reply to the request by a message to the first device 110, the message comprising a request for the user login.

In the step 203, the server 100 retrieves from the database 103 the profile associated to the user, that is to say, to the received login. The profile comprises information associated to the user and also information associated to previously used devices by the user to access the social network.

The request received in step 202 may comprise information allowing the server 100 to identify the first device 110, like for information a MAC address or an IMEI (International Mobile Equipment Identity) if the first device is a phone. If the request received in step 202 does not comprise any information allowing the server 100 to identify the first device 110, the server 100 may send a message to the first device 110 requesting the device to answer with a message comprising information to identify the first device 110.

Using the information identifying the first device 110, the server 100 retrieves in the retrieved profile of the user information associated to the first device 110. In other words, a device profile associated to the first device 110 is retrieved by the server 100 in the user profile.

In an alternative embodiment, the server 100 retrieves in the profile of the user information about the last device used by the user to connect to the social network, independently of the actual device used.

In a step 204, the server 100 generates a challenge comprising a question and a corresponding response from the retrieved profile associated to the first device 110. Examples of such challenges are listed here:

IMEI of the first device?

A particular ID of a particular component of the first device? (MAC address, processor reference, serial number of a component . . . )

processor(s) speed; number of processor of the first device?

size of a given file on the first device?

any parameter associated to a given file stored on the first device?

any parameter associated to a component of the first device?

Operating System version; patches installed?

geolocation information of the first device when last authentication process occurred?

All these information are information uploaded by the first device during the last connections of the device, or information previously entered by the user.

In one particular embodiment, the server may generate a challenge by calculating a particular parameter of a given file on the first device, for example a hash value of a file stored on the first device 110. A hash function is any function that can be used to map digital data of arbitrary size to digital data of fixed size, with slight differences in input data producing very big differences in output data. The question would be what is the hash value of said file on the first device when the response to the challenge would be the hash value itself. More complex challenges may be built by using a combination of different parameters. For example the question could be a hash of the combination of different parameters associated to different files.

In the step 205, the server 100 sends a message comprising the question of the challenge to the first device 110. The first device 110 shall calculate the answer to the question and send back the answer. If the question is the serial number of a component or a hash value of a given file of the first device, or a combination, the value shall be retrieved or calculated—or both—by the first device 110 and sent back to the server 100.

In the step 206, the server 100 receives the message from the first device comprising the response to the question of the challenge. According to the implementation of the system, the message may comprise the response itself or a hash value calculated by the first device 110 of the response.

In the step 207, the server 100 determines if the received response from the first device 110 corresponds to the response of the generated challenge in step 204.

When determining that the response received from the first device does not match the response corresponding to the challenge generated in step 204, the present system method is stopped. According to the implementation, the server may:

go back to step 204 to generate a new challenge, such new generation of challenge may be limited to a limited number of retry, close the authentication process and go back to step 201, launch a new authentication process—not illustrated here—, relying for example on others methods, like user login/password, secure ID card or the exchange of messages with a previously identified and trusted device (like an authentication SMS sent to a mobile phone), On the contrary, when determining that the response received from the first device matches the response corresponding to the challenge generated, authentication of the first device 110 is granted in a step 208.

In one implementation of present system, when determining that the response received from the first device matches the response corresponding to the challenge generated, the server 100 may directly authenticate the user based on the login provided in step 202. Complementarily, when determining that the response received from the first device does not match the response corresponding to the challenge generated in step 204, the server 100 may request the user to enter the password corresponding to the login received in step 202. Thus, the method of present system facilitates the authentication of a user requesting access to the social network from a previously used device as no password may be needed.

In another implementation, the determining that the response received from the first device matches or does not match the response corresponding to the challenge generated may trigger different authentication method, the one corresponding to the no match case being more secure but also probably more cumbersome for the user.

In any case, when determining that the response received from the first device matches the response corresponding to the challenge generated, the first device 110 shall collect some information about itself and send them to the sever 100.

So, in the step 209, the server 100 receives a further message from the first device 110 comprising contextual information about the first device 110.

In the step 210, the server 100 updates the profile associated to the user of the first device with the received contextual information and stores corresponding updates in the database 103. Such contextual information can be, as seen in step 204:
  IMEI of the first device,
  a particular ID of a particular component of the first device (MAC address, processor reference, serial number of a component . . . ),
  processor(s) speed; number of processor of the first device,
  size of a given file on the first device,
  any parameter associated to a given file stored on the first device,
  any parameter associated to a component of the first device,
  Operating System version; patches installed,
  geolocation information of the first device.

In one implementation of present system, recently updated contextual information shall be used when generating the challenge of step 204. Thus, the system is robust against replay attack as the challenge is renewed each time, as based on newly updated contextual information.

The user may access and navigate the social network in step 211.

The user may disconnect form the social network in a step 212, or may be disconnected automatically after the expiration of a timer.

The profile associated to a user may comprise several profile associated to different devices previously used by the user to connect to the social network.

It is to be noted that in the case that a first device is used for the very first time by a user, this method cannot be directly used as no contextual information has been collected by the server yet. Nevertheless, in an alternative and complementary embodiment of present system, such contextual information may be collected and provided to the server in preparation of the future usage of a first device. For example, the user may manually feed contextual information on the server, such as identification information of the device—for example the device IMEI—that shall be used as starting contextual information. The server may moreover collect from other sources contextual information linked to the device, using the identification information provided. For example, the server may retrieve technical information related to the device using the device IMEI and use the technical information related to the device as contextual information for the very first request for authentication.

In an alternative implementation, the first iterations of the present invention (for instance the first ten iterations) could be protected by an additional authentication method to allow the second device to populate the database with the contextual information collected on the first device. This number of first iterations protected by an additional authentication method may be predetermined of configured by the user.

In an alternative embodiment of the present system, some specific future contextualization information is generated and populated inside the first device after the authentication phase. The type of contextual information to be populated may be of various natures, as illustrated by the following list which shall not be understood as a limitation of the present invention:
  addition of specific contextual information inside an existing HTTP cookie (in short, cookie) on the first device, a cookie being a small piece of data sent from a website and stored in a user's web browser while the user is browsing that website,
  generation of a specific cookie (name and or content to be particularized for the first device and user),
  specific technical file to be use later by the system based on its names and or content,
  specific logs or lines of comments to be added inside an existing file stored on the first device (the file could be user oriented or specific to the operating system),
  a specific executable file that could be used later for a new challenge by the second device,
  a specific content like a photo or sound file (which could be used later to compute hash signature in relation with others methods),
  a specific URL, stored as a file or added in some structure of data dedicated to an application, the URL could comprise random information, to be used as security seed or token, or real site information that will deliver a seed for authentication. The number of usages of this specific URL can be restricted to a limited number or could be unlimited.

All the information installed or stored (file or content) could be used in two ways:
  a passive way in which contextual information associated to this content can be used as seed for authentication, or,
  an active way in which the content can be used to generate actions and results that will be exploited during the authentication challenge or later due to the fact that specific action have had an alteration on the first device.

Finally, the above discussion is intended to be merely illustrative of the present system and should not be construed as limiting the appended claims to any particular embodiment or group of embodiments. Thus, while the present system has been described with reference to exemplary embodiments, such as embodiment described in the different figures, it should also be appreciated that numerous modifications and alternative embodiments may be devised by those having ordinary skill in the art without departing from the broader and intended spirit and scope of the present system as set forth in the claims that follow. Further, while exemplary illustrations were provided to facilitate an understanding of the present system, other system for implementing the method described here before may be provided in accordance with further embodiments of the present system.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated;

i) the term "plurality of" an element includes two or more of the claimed element, and does not imply any particular range of number of elements; that is, a plurality of elements may be as few as two elements, and may include an immeasurable number of elements, and;

j) the term "greater than" (respectively "lower than") should be understood as "strictly greater than" (resp. "strictly lower than") or "greater than or equal to" (resp. "lower than or equal to"), both implementation being possible unless specifically indicated.

The invention claimed is:

1. A method for authenticating a first device, the method being executed by a second device, the second device comprising a database, the database storing a profile associated to a user of the first device, the method comprising:
receiving a request for authentication from the first device;
upon reception of the request for authentication, using the profile of the user to generate and send to the first device a first challenge comprising a question about a characteristic of the first device and a corresponding response for authentication of the first device; and
authenticating the first device using the first challenge based on a response to the first challenge issued by the first device independent of user input, wherein a successful authentication of the first device using the first challenge triggers:
immediately collecting contextual information from the first device, the contextual information including information that uniquely identifies the first device; and
updating the profile associated to the user of the first device with the collected contextual information for a subsequent generation of a second challenge including a second question about another characteristic of the first device for authentication of the first device.

2. The method according to claim 1, wherein the generation of the first challenge is based at least on contextual information received during a previous updating of the profile.

3. The method according to claim 1, comprising requesting the contextual information from the first device.

4. The method according to claim 1, wherein the contextual information includes a parameter associated with a component of the first device.

5. The method according to claim 1, wherein the profile of the user comprises one or more device profiles associated with one or more respective devices used by the user.

6. The method of claim 5, comprising:
receiving a request for authentication from the first device, the request for authentication including information identifying the first device to the second device;
retrieving, from the profile associated to the user of the first device, a device profile associated with the first device, wherein the device profile comprises information that uniquely identifies the first device; and
generating the first challenge using the retrieved device profile associated with the first device.

7. A server comprising a non-transitory computer readable medium, the medium storing a profile associated to a user of a first device, the server being adapted for:
receiving a request for authentication from the first device;
upon reception of the request for authentication, using the profile of the user to generate and to send to the first device a first challenge comprising a question about a characteristic of the first device and a corresponding response for authentication of the first device; and
authenticating the first device using the first challenge based on a response to the first challenge issued by the first device independent of user input, wherein a successful authentication of the first device using the first challenge triggers:
immediately collecting contextual information from the first device, the contextual information including information that uniquely identifies the first device; and
updating the profile associated to the user of the first device with the collected contextual information for a subsequent generation of a second challenge including a second question about another characteristic of the first device for authentication of the first device.

8. The server according to claim 7, wherein the generation of the first challenge is based at least on contextual information received during a previous updating of the profile.

9. The server according to claim 7, wherein the server is further adapted to request the contextual information from the first device.

10. The server according to claim 7, wherein the contextual information includes a parameter associated with a component of the first device.

11. The server according to claim 7, wherein the profile of the user comprises one or more device profiles associated with one or more respective devices used by the user.

12. The server according to claim 11, wherein the server is further adapted for:
receiving a request for authentication from the first device, the request for authentication including information identifying the first device to the second device;
retrieving, from the profile associated to the user of the first device, a device profile associated with the first device, wherein the device profile comprises information that uniquely identifies the first device; and
generating the first challenge using the retrieved device profile associated with the first device.

13. An application program embodied on a non-transitory computer readable medium and arranged to execute a method for authenticating a first device, the method being executed by a second device, the second device comprising a database, the database storing a profile associated to a user of the first device, the method comprising:
receiving a request for authentication from the first device;
upon reception of the request for authentication, using the profile of the user to generate and send to the first device a first challenge comprising a question about a characteristic of the first device and a corresponding response for authentication of the first device; and
authenticating the first device using the first challenge based on a response to the first challenge issued by the first device independent of user input, wherein a successful authentication of the first device using the first challenge triggers:
immediately collecting contextual information from the first device, the contextual information including information that uniquely identifies the first device; and
updating the profile associated to the user of the first device with the collected contextual information for a subsequent generation of a second challenge including a second question about another characteristic of the first device for authentication of the first device.

14. The application program according to claim 13, wherein the generation of the first challenge is based at least on contextual information received during a previous updating of the profile.

15. The application program according to claim 13, the method further comprising requesting the contextual information from the first device.

16. The application program according to claim 13, wherein the contextual information includes a parameter associated with a component of the first device.

17. The application program according to claim 13, wherein the profile of the user comprises one or more device profiles associated with one or more respective devices used by the user.

18. The application program according to claim 17, wherein the method further comprises:
receiving a request for authentication from the first device, the request for authentication including information identifying the first device to the second device;
retrieving, from the profile associated to the user of the first device, a device profile associated with the first device, wherein the device profile comprises information that uniquely identifies the first device; and
generating the first challenge using the retrieved device profile associated with the first device.

* * * * *